Aug. 4, 1953  G. D. PAXSON  2,647,998
METHOD AND APPARATUS FOR DETERMINING FREQUENCY
Filed April 3, 1952  2 Sheets-Sheet 2

INVENTOR.
GORDON DONALD PAXSON
BY
Roland A. Anderson
ATTORNEY.

Patented Aug. 4, 1953

2,647,998

UNITED STATES PATENT OFFICE 2,647,998

METHOD AND APPARATUS FOR DETERMINING FREQUENCY

Gordon Donald Paxson, El Cerrito, Calif., assignor to the United States of America as represented by the United States Atomic Energy Commission Application April 3, 1952, Serial No. 280,209

5 Claims. (Cl. 250—27)

The present invention relates to a method and apparatus for determining frequency and more particularly to a method and apparatus providing measurement of the frequency of a frequency-modulated signal.

Several methods of frequency determination are known and one such has been to display the signal upon the screen of a cathode ray tube and to then count the cycles during the excursion of frequency. Another method has been developed utilizing the steps of applying the frequency-modulated signal to one set of deflection plates of a cathode ray tube, biasing the other set of deflection plates with a known frequency-modulated voltage, and adjusting the frequency of the latter to obtain a predetermined Lissajous figure on the screen from which the frequency of the former may be determined. Other well-known methods may be found in texts covering the electronic field, including those of frequency marker systems and crystal detector circuits.

Such methods and apparatus, as described above, while operable at the higher frequencies, are subject to inherent inaccuracies as the frequency range is increased. The present invention overcomes such inaccuracies by providing a method of frequency measurement which applies to all ranges of frequency and an apparatus which is readily adaptable to such method.

It is therefore an object of the present invention to provide a new and improved method and apparatus for determining the frequency of a frequency-modulated signal.

Another object of the present invention is to provide an electronic frequency-sensitive apparatus which develops an output pulse of voltage each time the signal voltage passes through a predetermined frequency interval.

A further object of the invention is to provide a frequency marker system utilizing a delayed portion of the input signal voltage to form coincidences with such input signal voltage.

Still another object of the present invention is to provide an electronic frequency measuring apparatus for frequency-modulated systems utilizing conventional electrical elements well within the ratings thereof.

Figure 1:
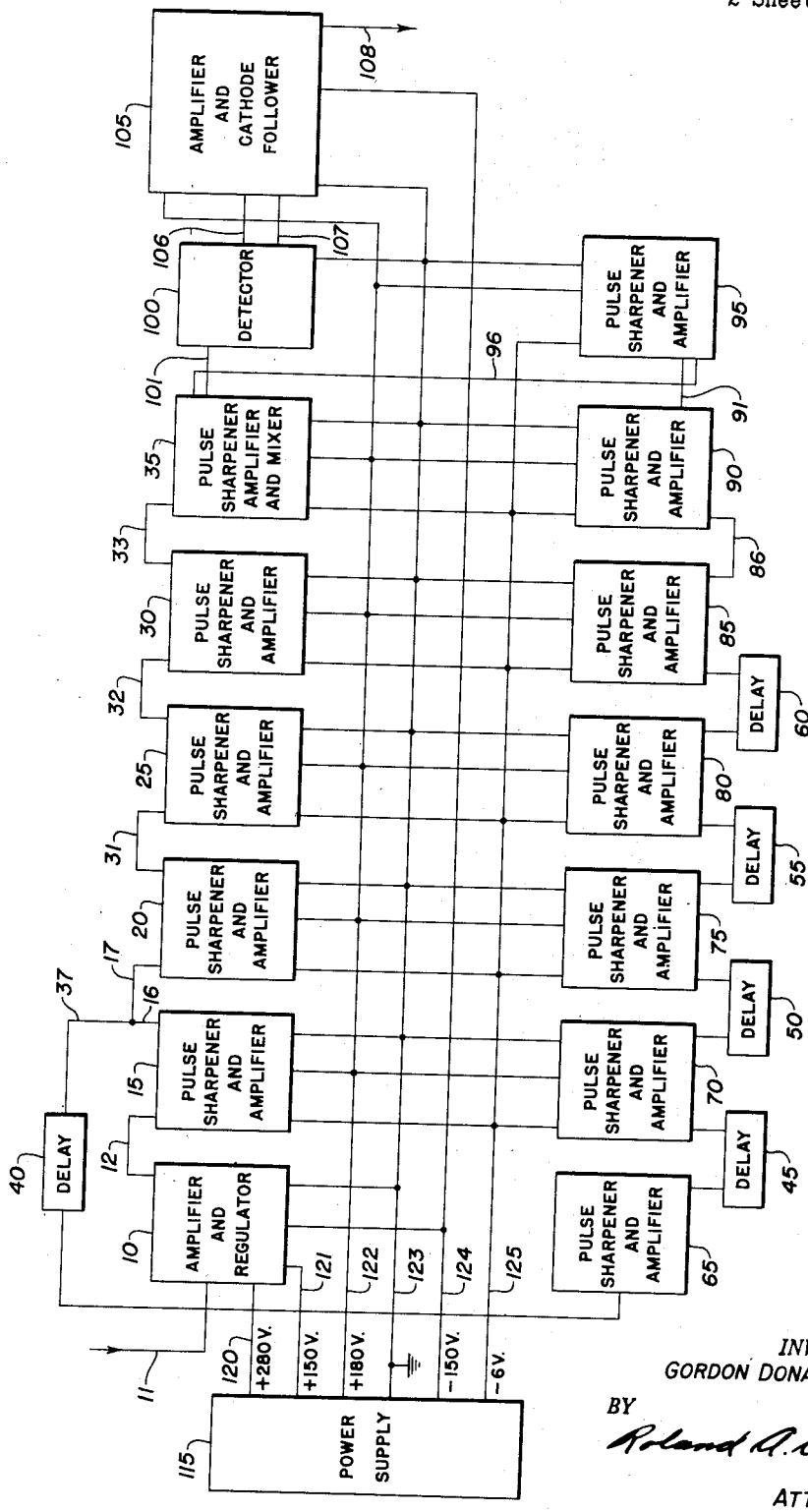
Figure 2:
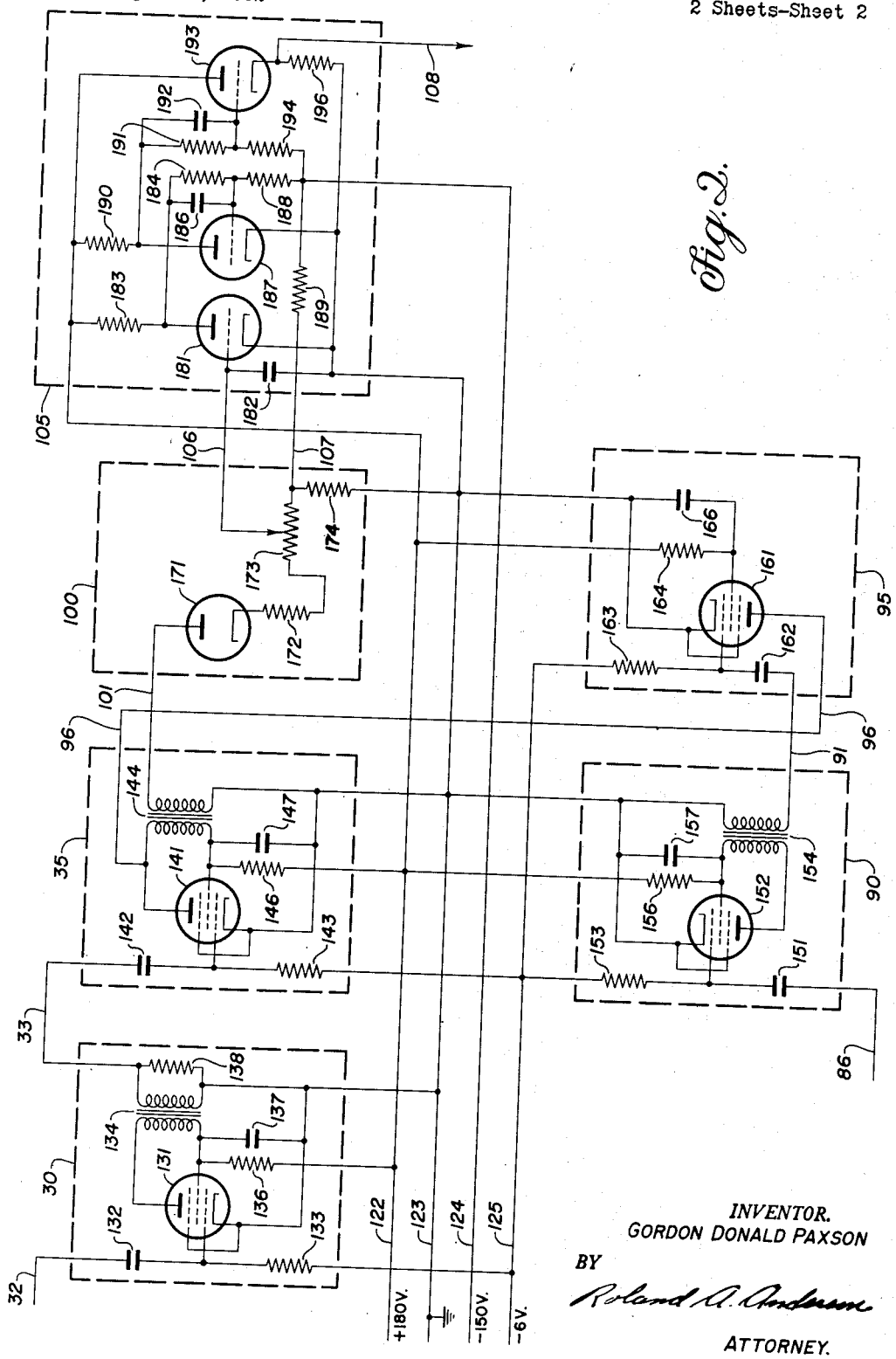

Further objects and advantages of the present invention will be readily apparent from the following description and claims considered together with the accompanying drawing, in which:

Figure 1 is a block diagram of a preferred embodiment of the present invention; and Figure 2 is a partial wiring diagram of the invention as illustrated in Fig. 1.

Referring to the drawing in detail, and Fig. 1 in particular, there is provided a conventional amplifier and regulator unit 10, to the input of which an unknown frequency-modulated signal voltage may be connected by means of a lead 11. The action of the amplifier section of the amplifier and regulator unit 10 is to increase the amplitude of the frequency-modulated signal voltage and the regulator section thereof provides constancy to the amplitude to prevent amplitude modulation in the output signal at a lead 12. Such lead 12 is connected to the input of a first pulse sharpener and amplifier unit 15 which forms a pulse of voltage at substantially the peak value of the signal on alternate half-cycles of the signal voltage as applied and which amplifies the resulting pulses of voltage to an output lead 16. The circuit connections and operation of the pulse sharpener and amplifier unit 15 will be described more fully hereinafter.

The pulses of voltage of the of the lead 16 are then applied to two different channels. A lead 17 connected to the lead 16 impresses the pulses of voltage thereof upon the input of one channel comprising three series-connected pulse sharpener and amplifier units 20, 25, 30, which are interconnected by leads 31 and 32, respectively. An output lead 33 is connected from the output of the latter pulse sharpener and amplifier unit 30 to the input of a pulse sharpener, amplifier, and mixer unit 35, of which the pulse sharpener and amplifier sections serve the same purpose as and are similar to the other pulse sharpener and amplifier units 15, 20, 25, and 30. The mixer portion of the unit 35 will be described in detail hereinafter.

A lead 37, also connected to the lead 16, serves to impress the pulses of voltage thereat upon the input of a second channel comprising a series of five delay units 40, 45, 50, 55, and 60 alternately interconnected to five pulse sharpener and amplifier units 65, 70, 75, 80, and 85 which are similar to the aforementioned units 15, 20, 25, and 30. The output of the final pulse sharpener and amplifier unit 85 is connected by a lead 86 to a further pulse sharpener and amplifier unit 90 and the output of the latter is connected by a lead 91 to still another similar unit 95. The output of the latter pulse sharpener and amplifier unit 95 is connected by a lead 96 to the mixer section of the pulse sharpener, amplifier, and mixer unit 35 where the pulses of the two channels are added together to form coincidence pulses of voltage having greater amplitude than either of the channels taken singly.

A detector unit 100, responsive only to pulses of voltage having an amplitude greater than those of the two channels taken singly, has the input thereof connected to the output of the pulse sharpener, amplifier, and mixer unit 35 by a lead 101. As an output unit for the circuit there is provided an amplifier and cathode follower unit 105 which has the input thereof connected to the output of the detector unit 100 by two leads 106 and 107, the former of which carries the signal voltage and the latter of which provides a bias voltage as will be described in detail hereinafter. The output of the amplifier and cathode follower unit 105 is taken from the cathode of the cathode follower by a lead 108 and may be connected to an oscilloscope (not shown) in a conventional manner to display the series of pulses of voltage developed as a function of frequency.

A power supply 115 is provided to furnish suitable operating potentials to the above-described circuit and, as such, has six output leads 120–125, inclusive. The lead 123 is grounded, the lead 120 has a positive voltage of 280 volts, the lead 121 has a positive voltage of 150 volts, the lead 122 has a positive voltage of 180 volts, the lead 124 has a negative voltage of 150 volts, and the lead 125 has a negative voltage of 6 volts, such voltages all being with respect to the grounded terminal 123.

Briefly, the circuit operates to form a positive pulse of voltage in response to each positive half cycle of the applied frequency-modulated input voltage by the pulse sharpener and amplifier unit 15. Such pulses are then sharpened and amplified through one channel of the circuit comprising the pulse sharpener and amplifier units 20, 25, and 30 to the pulse sharpener, amplifier, and mixer unit 35. Such pulses are also sharpened and amplified through a second channel comprising the pulse sharpener and amplifier units 65, 70, 75, 80, 85, 90, and 95 to the pulse sharpener, amplifier, and mixer unit 35. The latter channel also contains five delay units 40, 45, 50, 55, and 60 which provide a desired delay time, such as 20 microseconds in the illustrated embodiment of the invention. Thus, if the frequency of the frequency-modulated wave changes so that at the end of the desired delay time the voltages of both channels are in phase, a coincidence pulse of voltage will result. In the example given, where the delay time is 20 microseconds, a coincidence pulse of voltage will be developed each time the frequency of the input signal changes through 50 kilocycles, which is equivalent to 20 microseconds per cycle. The detector unit 100 passes only the coincidence pulses to the amplifier and cathode follower unit 105 so that a pulse of voltage representing a predetermined frequency results at the lead 108 which is a submultiple of the change in the frequency-modulated signal.

For convenience only, one of the pulse sharpener and amplifier units 15, 20, 25, and 30 will be illustrated (see Fig. 2) and described in detail, since such units are similar in the first channel. Thus, in Fig. 2, the lead 32 is coupled to the control grid of a pentode type tube 131 within the pulse sharpener and amplifier unit 30 through a coupling capacitor 132. The control grid of the tube 131 is further connected to one end of a grid resistor 133, the other end of which is connected to the lead 125 having a negative voltage of 6 volts. A connection is made from the suppressor grid of the tube 131 to the cathode which is, in turn, directly connected to the grounded lead 123 of the power supply 115. One winding of a transformer 134 is connected between the anode and screen grid of the tube 131 and the latter element is connected through a dropping resistor 136 to the positive lead 122 carrying 180 volts and through a by-pass capacitor 137 to the cathode of the tube. The other winding of the transformer 134 is parallel-connected with a resistor 138 and serves as the output of the pulse sharpener and amplifier unit 30 by connecting one side to the cathode of the tube 131 and the other side to the output lead 133.

When a frequency-modulated signal voltage is applied at the lead 32, the coupling capacitor 132 transfers the signal to the control grid of the tube 131 where it is developed across the resistor 133 which is connected to the lead 125 bearing a negative bias voltage. The result of the foregoing is that the tube 131 conducts only on the positive portion of the input signal voltage cycle and then near the peak amplitude thereof. Thus the time of conduction of the tube will be substantially less than the period of the half cycle of the input voltage to form a narrow pulse of voltage. By utilizing transformer coupling from the anode circuit of the tube 131, the output pulse of voltage at the lead 33 will have the same polarity as the portion of the input signal voltage which causes conduction of the tube. The values of the voltages applied and of the circuit elements are such that amplification is present. It will be readily apparent that such pulse sharpener and amplifier unit 30 will operate in a similar manner when a series of positive pulses of voltage are applied at the input lead 32 rather than a frequency-modulated signal voltage as above described.

The series of pulses of voltage, occurring at a rate equal to the frequency of the frequency-modulated signal voltage, of the lead 33 are coupled to the control grid of a pentode type tube 141 of the pulse sharpener, amplifier, and mixer unit 35 by a coupling capacitor 142. The control grid of the tube 141 is also connected to one end of a resistor 143, the other end of which is connected to the negative lead 125 carrying 6 volts. The suppressor grid of the tube 141 is connected directly to the cathode thereof and the cathode, in turn, is connected directly to the grounded lead 123. One winding of a transformer 144 is connected between the anode and the screen grid of the tube 141 while the latter element is connected through a dropping resistor 146 to the positive lead 122 having 180 volts impressed thereon and through a capacitor 147 to the cathode of the tube. The other winding of the transformer is connected at one end directly to the cathode and at the other end to the output lead 101. Without further connections it is apparent that the unit, as described, is operative in the same manner as the pulse sharpener and amplifier 30 previously described.

In the second channel of the circuit there is provided a plurality of pulse sharpener and amplifier units 65, 70, 75, 80, 85, 90, and 95 and for simplicity, because each is similar to the other except for the last, only the latter two will be described in detail. The input lead 86 has impressed thereon the delayed series of pulses developed by the preceding units and applies the same through a coupling capacitor 151 upon the control grid of a pentode type tube 152 within the pulse sharpener and amplifier unit 90. The control grid of the tube 152 is further connected to one end of a resistor 153, the other end of which is connected to the negative 6 volt lead 125. A connection is made from the suppressor grid of the tube 152 to the cathode which is, in turn, directly connected to the grounded lead 123. One winding of a transformer 154 is connected between the anode and the screen grid of the tube 152 and the latter element is connected to the positive 180 volt lead 122 through a dropping resistor 155 and to the grounded lead 123 through a by-pass capacitor 157. The other winding of the transformer 154 is connected with one end directly to the grounded lead 123 and the other end to the output lead 91. It will be apparent by comparison with pulse sharpener and amplifier unit 30 that the operation of the unit just described is the same and, therefore, that pulses impressed by the lead 86 are sharpened and amplified to the output lead 91.

Similarly, the lead 91 impresses the series of pulses of voltage thereat upon the control grid of a pentode type tube 161 through a coupling capacitor 162 within the pulse sharpener and amplifier unit 95. The control grid is also connected to one end of a resistor 163, the other end of which is connected to the negative 6 volt lead 125. The suppressor grid of the tube 161 is directly connected to the cathode which, in turn, is connected to the grounded lead 123. To supply an operating potential to the screen grid a resistor 164 is connected therefrom to the positive 180 volt lead 122 and a capacitor 166 is connected from such grid to the grounded lead 123 to by-pass radio frequency voltages. The anode of the tube 161 is directly connected to the lead 96 which, in turn, is directly connected to the anode of the tube 141 within the pulse sharpener, amplifier, and mixer unit 35 so that the two tubes have a common anode supply voltage, output transformer 144 and dropping resistor 146.

Since the anodes of the two tubes 141 and 161 are connected together, the voltages of both channels are added together at the transformer 144 thereby resulting in larger than normal pulses of voltage whenever two of the pulses coincide. The pulses of voltage of the output lead 101 of the pulse sharpener, amplifier, and mixer unit 35 are directly connected to the anode of a diode type tube 171 of the detector unit 100. A series connected resistor 172, potentiometer 173, and resistor 174 are connected, in that order, between the cathode of the tube 171 and the grounded lead 123 with the adjustable arm of the potentiometer connected to the output lead 106 and the junction between the potentiometer and latter-mentioned resistor connected to the second lead 107.

The voltage of the lead 106 is directly connected to the control grid of an amplifying triode type tube 181 and by-passed to the grounded lead 123 by a capacitor 182 within the amplifier and cathode follower unit 105. The cathode of the tube 181 is directly connected to the grounded lead 123 and the anode thereof is connected to one end of a dropping resistor 183, the other end of which is connected to positive 180 volt lead 122. The anode of the tube 181 is also connected to one end of a parallel-connected resistor 184 and capacitor 186 coupling combination and the other end of such combination is directly connected to the control grid of a second amplifying triode type tube 187. A negative bias is applied to the control grid of the tube 187 and to the lead 107 by connecting the negative 150 volt lead 124 to the former through a resistor 188 and to the latter through a resistor 189. The cathode of the tube 187 is directly connected to the grounded terminal 123 and the anode is connected to the positive 180 volt lead 122 through a dropping resistor 190. A parallel combination of a resistor 191 and capacitor 192 is connected between the anode of the tube 187 and the control grid of a cathode follower triode type tube 193 to couple voltage changes from the former to the latter. The control grid of the tube 193 is also connected to the negative 150 volt lead 124 through a resistor 194. The anode of the tube 193 is directly connected to the positive 180 volt lead 122 and the cathode is connected to one end of a cathode resistor 196 having the other end thereof connected to the grounded lead 123. It will be noted that the output lead 108 is directly connected to the cathode of the cathode follower tube 193.

Considering the operation of the detector unit 100 and the amplifier and cathode follower unit 105 together, it will be seen that the cathode of the diode tube 171 is negatively biased and the amount of such bias is determinative of the value of positive voltage required at the anode of the tube for conduction thereof. Since it is only upon the occurrence of a coincidence between pulses of voltage of the two channels that conduction is desired, the negative bias should be substantially greater than the expected voltage from the channels singly. The connections of the unit 100 have been described to accomplish such result. Conduction within the tube 171 causes a flow of current through the cathode circuit thereof which is partially applied as a voltage to the amplifier tube 181 by the output lead 106, the value of which is adjustable by the setting of the potentiometer 173. Such voltage is then amplified through the two stages of amplification of tubes 181 and 187 and finally impressed upon the cathode follower tube 193, the cathode of which serves as an output connection for the circuit output lead 108.

Consider now the operation of the entire circuit as described in the foregoing with the power supply 115 suitably energized. Under such condition a frequency-modulated signal voltage applied to the amplifier and regulator unit 10 by means of the lead 11 will be amplified in a conventional manner with any amplitude modulation removed by a regulator or automatic gain control circuit interconnected in a conventional manner therein. The output voltage of the amplifier and regulator unit 10 is then impressed upon the first pulse sharpener and amplifier unit 15 by the lead 12. As has been stated previously, the pulse sharpener and amplifier unit 15 is similar in construction and operation to the pulse sharpener and amplifier unit 30 which has been described in detail in the foregoing paragraphs. Thus the frequency-modulated signal voltage as applied by the lead 12 is developed into a series of amplified and narrower pulses of voltage having a repetition rate equivalent to that of the input signal voltage by the action of the negatively biased amplifier tube within the unit 15. Such series of amplified pulses of voltage appears at the output lead 16 of the pulse sharpener and amplifier unit 15 in the same phase as the portion of the input voltage utilized to drive the unit and is applied to the two channels of the circuit.

The lead 17, which is connected to the output lead 16, applies the series of amplified pulses of voltage to one channel which comprises three further series-connected pulse sharpener and amplifier units 20, 25, and 30 for additional sharpening and amplification of the pulses of voltage. Each of such units decreases the duration time of the individual pulses of voltage so that the final pulse of voltage is considerably narrower than the half cycle time of the frequency-modulated input voltage. The output voltages of the final pulse sharpener and amplifier 30 of the channel is then applied by the lead 33 to the pulse sharpener, amplifier, and mixer unit 35 where the pulses of voltage are further sharpened and amplified to a mixer stage thereof.

The lead 37, which is connected to the output lead 16, applies the series of amplified pulses of voltage to the second channel which comprises alternately connected delay units 40, 45, 50, 55, and 60 and pulse sharpener and amplifier units 65, 70, 75, 80, and 85. A pulse sharpener and amplifier unit is connected into the channel after each delay unit because such delay units inherently increase the duration of pulses of voltage applied thereto. Preferably the delay units 40, 45, 50, 55, and 60 are sections of coaxial line having a time constant which in each instance is equal to a similar fractional portion of the desired over-all delay time; however, it will be readily apparent that delay units fabricated from lumped inductive and capacitive elements could be substituted therefor. The pulses of voltage of the second channel are then further sharpened and amplified through two more pulse sharpener and amplifier units 90 and 95 before being applied to the mixer stage of the pulse sharpener, amplifier, and mixer 35. Thus at such mixer stage the pulses of voltage of each channel should have substantially the same duration time which decreases the opportunity for chance coincidences. As has been described in the foregoing, the signals of the two channels are mixed at the anode winding of the transformer 144 of the pulse sharpener, amplifier, and mixer 35 and applied from the second winding of such channel to the detector unit 100. The latter unit 100 comprises the diode tube 171 which has a negative bias applied at the cathode thereof so that conduction will occur only when pulses of voltage of the two channels are in phase to form a coincidence. Such coincidence pulses of voltage are then amplified and applied to the cathode follower tube 193 to form an output pulse at the lead 108. Thus, there is a series of pulses of voltage developed at the output lead 108 which have a predetermined time spread equivalent to a certain change in the frequency of the frequency-modulated input voltage which is available as frequency markers or as an indication of the frequency.

Now, in the instance where the total delay time of the delay units 40, 45, 50, 55, and 60 is set at 20 microseconds, the operation of the circuit may be readily understood by considering a source of frequency-modulated voltage connected to a single coaxial line having a 20 microsecond delay time. Under such circumstance, if the frequency of the input voltage is one megacycle at the start and changes through a frequency of several megacycles, then the output and the input voltages will be in phase at intervals equivalent to fifty kilocycles of frequency change. By impressing such input and output voltages upon a phase sensitive device, it is possible to pass only the coincident pulses which may be utilized to mark the frequency.

It will be noted from the foregoing that the delay introduced into the second channel has been inserted in five steps and while such procedure is not necessary, it has been found that better accuracy results. The same has been found with respect to the plurality of sharpening and amplifying units employed in both channels and a pulse width of substantially .007 microsecond has been obtained.

While the salient features of the invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a frequency marker pulse generator for a frequency-modulated system, the combination comprising means for developing a pulse of voltage in response to each positive half cycle of a frequency-modulated signal voltage, a first and a second channel connected to said means, means included in said first channel for sharpening and amplifying said pulses of voltage, first means included in said second channel for delaying said pulses of voltage an interval of time equivalent to the cyclic period of a predetermined frequency, second means included in said second channel for sharpening and amplifying pulses of voltage delayed by said first means, means connected to said first and second channels for adding the voltage outputs thereof, and means connected to said last-named means for passing a voltage pulse only when pulses of voltage of said channels are in phase.

2. In a frequency marker pulse generator for a frequency-modulated system, the combination comprising a biased amplifier for developing a pulse of voltage in response to each positive half cycle of a frequency-modulated voltage, a first and second channel connected to the output of said amplifier, means included in said first channel for sharpening and amplifying said pulses of voltage, first means included in said second channel for delaying said pulses of voltage a predetermined interval, second means included in said second channel for sharpening and amplifying pulses of voltage delayed by said first means, means connected to said first and second channels for adding the voltage outputs thereof, and a detector diode circuit connected to said last-named means for passing only coincident pulses fo voltage.

3. In a frequency marker pulse generator for a frequency-modulated system, the combination comprising a biased amplifier rendered conductive at substantially the peak value of each cycle of a frequency-modulated signal voltage for developing pulses of voltage in response thereto, a first series of pulse sharpener and amplifier units connected to said amplifier for narrowing and amplifying said pulses of voltages, a series of alternate delay units and pulse sharpener and amplifier units connected to said amplifier, a second series of pulse sharpener and amplifier units connected to said last-named series, mixer means connected to the output of said first and second series of pulse sharpener and amplifier units, and a biased diode circuit connected to said mixer means for sorting coincidence pulses of voltage therefrom.

4. In a frequency marker pulse generator for a frequency-modulated system, the combination comprising a biased amplifier rendered conductive at substantially the peak value of each cycle of a frequency-modulated signal voltage for developing pulses of voltages in response thereto, a first series of biased amplifier tubes having transformer coupling therebetween connected to said first-named amplifier for sharpening and amplifying said pulses of voltage, a series of alternate delay units and biased amplifier tubes also connected to said first-named amplifier for developing delayed pulses of voltage, a second series of biased amplifier tubes having transformer coupling therebetween connected to said last-named series for sharpening and amplifying said delayed pulses of voltage, means connected to said first and second series of biased amplifier tubes for adding the voltage outputs thereof, and detector means connected to said last-named means for passing only coincident pulses of voltage.

5. In a frequency marker pulse generator for a frequency-modulated system, the combination comprising a biased amplifier rendered conductive at substantially the peak value of each positive half cycle of a frequency-modulated signal voltage for developing pulses of voltage in response thereto, a first series of biased amplifier tubes having transformer coupling therebetween connected to said first-named amplifier for sharpening and amplifying said pulses of voltage, a series of alternate delay units and biased amplifier tubes also connected to said first-named amplifier for developing delayed pulses of voltage, a second series of biased amplifier tubes having transformer coupling therebetween connected to said last-named series for sharpening and amplifying said delayed pulses of voltage, mixer means connected to the output of said first and second series of biased amplifier tubes, and a biased diode circuit connected to said mixer means for passing only coincidence pulses of voltage.

G. DONALD PAXSON.

References Cited in the file of this patent

UNITED STATES PATENTS

| Number | Name | Date |
|---|---|---|
| 2,421,138 | Wheeler | May 27, 1947 |
| 2,566,222 | Lynch | Aug. 28, 1951 |
| 2,614,218 | Hancock | Oct. 14, 1952 |